E. DUCHAMP.
Whiffletree.
No. 25,102.
Patented Aug. 16, 1859.
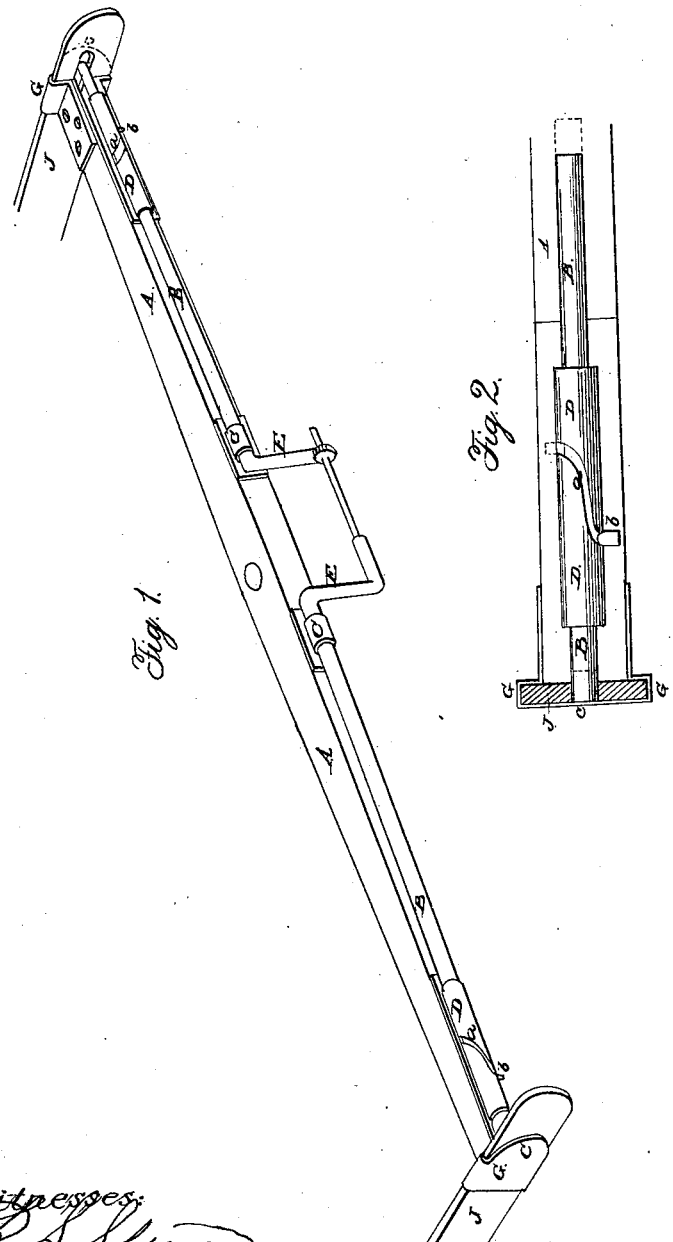

UNITED STATES PATENT OFFICE.

EUGÈNE DUCHAMP, OF ST. MARTINSVILLE, LOUISIANA.

SELF-RELEASING WHIFFLETREE.

Specification of Letters Patent No. 25,102, dated August 16, 1859.

*To all whom it may concern:*

Be it known that I, EUGÈNE DUCHAMP, of St. Martinsville, in the parish of St. Martins and State of Louisiana, have invented a new and useful Improvement in Whiffletrees; and I do hereby declare that the following is a full, clear, and exact description thereof, reference being had to the accompanying drawings, and to the letters of reference marked thereon, of which—

Figure 1 represents the whiffle-tree showing the manner of attaching and releasing the traces or tugs. Fig. 2 is an enlarged front view of one end of the whiffle-tree showing the rods in two positions.

My invention is for the purpose of releasing the traces so as to discharge the horse in case of a run-away, or other dangerous cause, at the same time to form a fastening for the ends of the traces in which there can be no liability to their accidental disengagement, yet, that the traces may be readily attached and detached with the hand; and it consists in having two rods fixed longitudinally on the back of the whiffle-tree by metal guards each provided with an oblique slot through which passes a pin, projecting from the rods; and in operating these rods with a rocking motion by suitable means hereinafter described so that they will recede from each other in locking or affixing the traces, and approach each other in detaching them abutting against flanges in each end of the whiffle-tree and keeping the traces in place: described as follows:—

A represents a whiffle-tree detached from the shafts of a carriage.

B, B are two rods which are fixed on the back of the whiffle-tree by guards, C C D D, and are capable of a longitudinal motion in opposite directions by means of arms or cranks, E E, which are bent portions of the rods, and which are operated by the driver by means of a chain or other suitable device in attaching, or detaching the horse from the vehicle in the following manner:

The guards, D D, are secured near the extreme ends of the whiffle-tree. These guards have slots, *a a*, made obliquely to the axis of the rods, B B, by which the crank or cranks, E, become levers for operating the rods. The slots, *a a*, in the two guards, D D, are placed in opposite directions and through them pass loosely pins, *b b*, which are fixed to the rods. Now it will be clearly seen that by raising the portion, E E, the pins, *b b*, will act upon the inner edges of the slots, and the rods will approach each other, and by depressing the portion, E E, the rods will each recede until this portion becomes vertical, the action being similar to the right and left bolts used for fastening windows and doors.

On each end of the whiffle-tree is fixed a loop or box, G, having a projecting lip, *c*. Into these boxes are placed the ends of the traces, J J, clearly shown by Fig. 1, the cock-eye of the trace being in a line with the rods, B B, when the ends of the traces are so placed. Now by depressing the portion, E E, as shown by Fig. 1, the ends of the rods will be thrown out against the lips of the boxes, G, passing through the cock-eyes of the traces retaining them securely in place and preventing them from accidental detachment. Then by rocking the rods in the opposite direction they will be simultaneously drawn out of the cock-eyes and the horse will be free to leave the carriage.

I am aware that spring bolts or rods have been used to accomplish this object; also that levers and crank-arms have been used, but these I do not claim.

What I claim as my invention, and desire to secure by Letters Patent, is:—

Operating the two rods simultaneously by means of the slotted guards, D D, in combination with boxes, G G, and lips, *c c*, in the manner and for the purposes herein specified.

EUGÈNE DUCHAMP.

Witnesses:
 R. S. SPENCER,
 M. M. LIVINGSTON.